United States Patent
McKinzie et al.

(10) Patent No.: US 7,822,191 B2
(45) Date of Patent: Oct. 26, 2010

(54) MULTI-MODAL ADDRESS BOOK

(76) Inventors: Christopher W. McKinzie, 423 Cadence Hill, San Antonio, TX (US) 78258; Claire S. Vishik, 5905 Lonesome Valley Trail, Austin, TX (US) 78731

( * ) Notice: Subject to any disclaimer, the term of this patent is extended or adjusted under 35 U.S.C. 154(b) by 502 days.

(21) Appl. No.: 11/176,321

(22) Filed: Jul. 8, 2005

(65) Prior Publication Data

US 2005/0243993 A1 Nov. 3, 2005

Related U.S. Application Data

(63) Continuation of application No. 10/245,324, filed on Sep. 18, 2002, now Pat. No. 6,956,942.

(51) Int. Cl.
 *H04M 1/00* (2006.01)
 *H04M 3/00* (2006.01)
(52) U.S. Cl. ............... 379/355.07; 379/355.04
(58) Field of Classification Search ............ 379/355.04, 379/355.07
 See application file for complete search history.

(56) References Cited

U.S. PATENT DOCUMENTS

| 5,483,586 | A | 1/1996 | Sussman |
| 5,717,863 | A | 2/1998 | Adamson et al. |
| 5,897,635 | A | 4/1999 | Torres et al. |
| 5,966,714 | A | 10/1999 | Huang et al. |
| 6,052,735 | A | 4/2000 | Ulrich et al. |
| 6,134,548 | A | 10/2000 | Gottsman et al. |
| 6,147,773 | A | 11/2000 | Taylor et al. |
| 6,269,369 | B1 | 7/2001 | Robertson |
| 6,374,259 | B1 | 4/2002 | Celik |
| 6,504,925 | B1 | 1/2003 | Schiachman et al. |
| 6,658,455 | B1 * | 12/2003 | Weinman, Jr. ............... 709/203 |
| 2001/0027472 | A1 | 10/2001 | Guan |
| 2002/0013815 | A1 | 1/2002 | Obradovich et al. |
| 2002/0052195 | A1 | 5/2002 | Lee |
| 2002/0159574 | A1 | 10/2002 | Stogel |
| 2003/0023759 | A1 * | 1/2003 | Littleton et al. ............. 709/248 |

* cited by examiner

*Primary Examiner*—Alexander Jamal
(74) *Attorney, Agent, or Firm*—Sterne, Kessler, Goldstein & Fox, P.L.L.C.

(57) ABSTRACT

A method is provided for synchronizing disparate customized address books which each include contact information including an email address for a customer. The method includes storing identification information for each communications partner. Each communications partner is associated with a different disparate customized address book. The identification information is used to update the disparate customized address books when the contact information of the customer is changed to changed contact information. The method also includes determining when the contact information of the customer changes to changed contact information. The method further includes updating each of the disparate customized address books to include the changed contact information when the contact information of the customer is changed to the changed contact information.

15 Claims, 8 Drawing Sheets

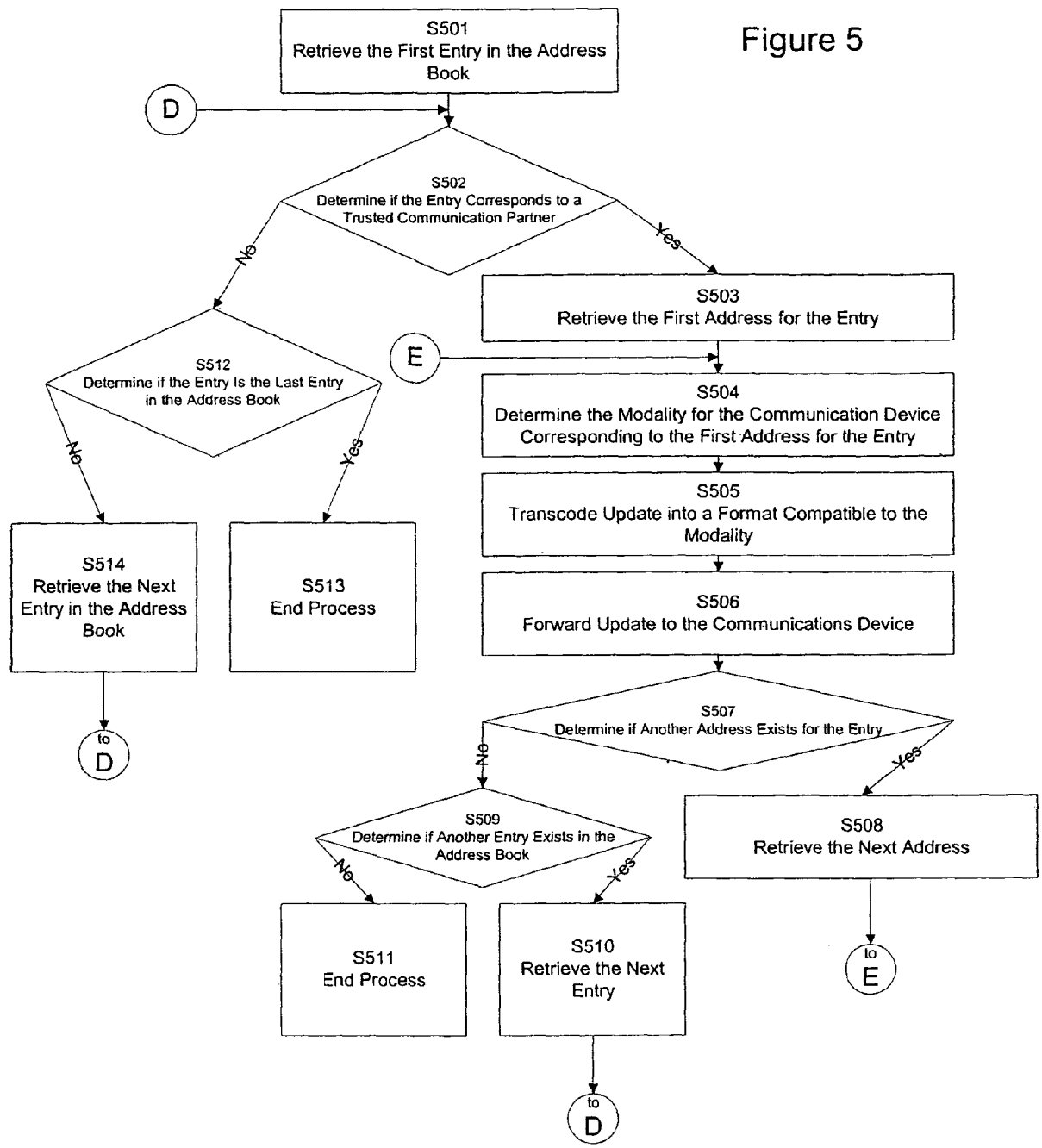

FIGURE 6
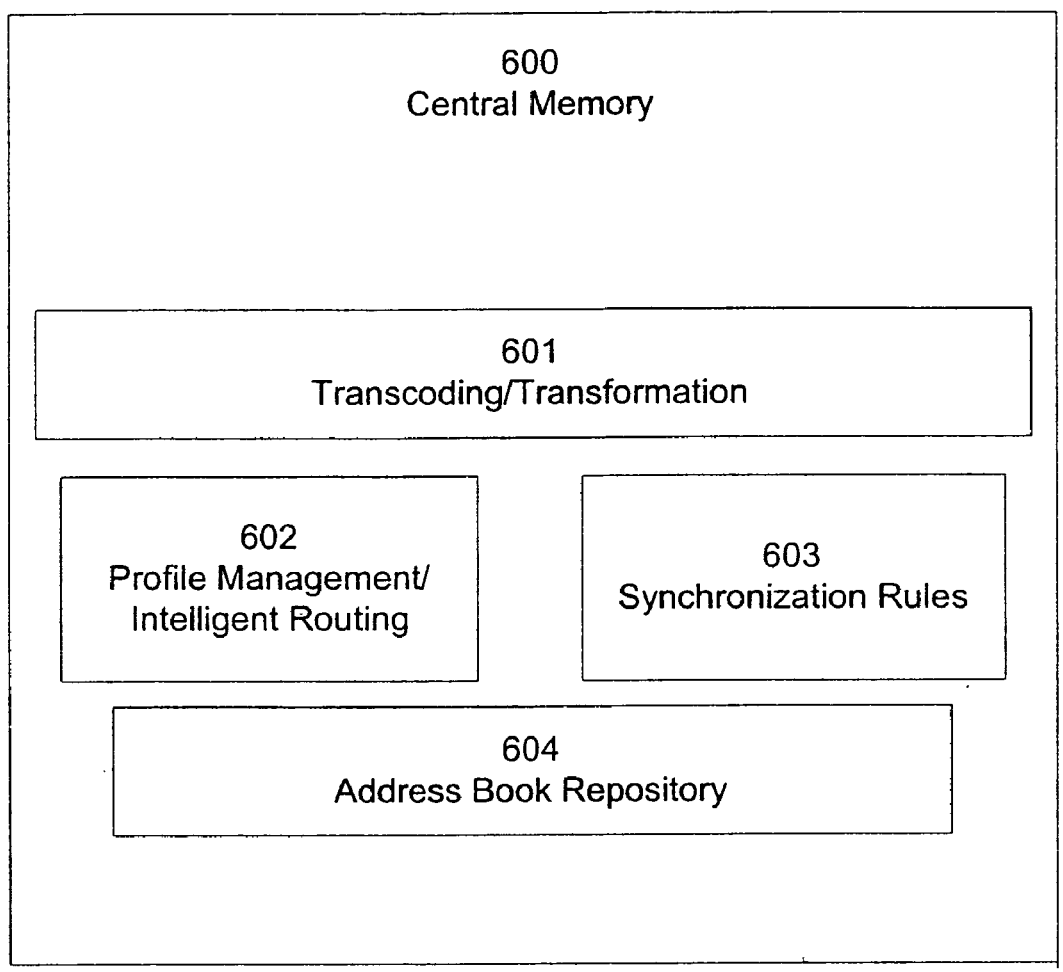
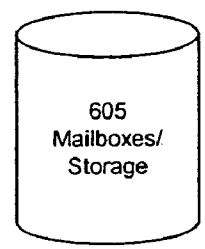

MULTI-MODAL ADDRESS BOOK

This application is a continuation of U.S. patent application Ser. No. 10/245,324, filed Sep. 18, 2002 (now U.S. Pat. No. 6,956,942 that issued Oct. 18, 2005), entitled "Multi-Modal Address Book" in the names of Christopher W. McKinzie et al., the disclosure of which is expressly incorporated by reference herein in its entirety.

BACKGROUND OF THE INVENTION

1. Field of the Invention

The present invention relates to an address book service in a communications environment. More particularly, the present invention relates to a communications system and method for a customer to manage and synchronize new and updated multi-modal addressing information.

2. Background Information

A need exists for a customer of a communications service to maintain a multi-modal address book with complete and up-to-date information. For example, conventionally, a customer of a telecommunications service provider may program telephone numbers into a wireline or wireless telephone as an address book. In addition, a customer of an internet service provider may maintain an address book or buddy list in association with an email or instant messaging account. A customer of both service providers may desire a complete address book that is available for accounts of both services and that includes information for both telecommunications and internet communications partners (e.g., telephone callers, email senders).

Additionally, when a communications partner changes address information, such as an email address, a customer may need to change more than one address book to update the address. Since a customer may have communications devices using different communications modes, maintaining reliable up-to-date address books can prove burdensome.

In some cases, an address book for a specific application, e.g., Microsoft Outlook, can be imported as a file and loaded into an application for a different account, e.g., an internet email account. However, importing a Microsoft Outlook address book can require significant effort and technical ability, similar to the burden of separately entering information of communications partners into different address books. Therefore, a Microsoft Outlook user may not be able to import and load a Microsoft Outlook address book to a device using a different communications mode such as short messaging service (SMS), instant messaging (IM) or traditional phone and facsimile service. Accordingly, a user with Microsoft Outlook will often rebuild an address book for new applications by hand rather than reload the information of communications partners from the Microsoft Outlook address book.

Moreover, individually notifying communications partners when a customer changes or updates information is time consuming and burdensome. Accordingly, a customer may wish to notify communications partners automatically when the customer's address information changes.

A communications system and method are needed for maintaining a centralized address book that stores multi-modal contact information and that is accessible using different devices and different communications modes and formats. In addition, a communications system and method are needed for automatically updating an address book when information changes for a customer or for a communications partner entered into an address book of the customer. Furthermore, a communications system and method are needed for synchronizing the centralized multi-modal address book with local copies that are stored in association with each of a customer's devices and accounts.

To solve the above-described problems, a communications system and method are provided for maintaining a multi-modal address book service in a communications environment.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout several views of the drawing, and in which:

FIG. 5 is a flow chart showing an exemplary method of updating address book information of a trusted communications partner using the multi-modal address book system, according to an aspect of the present invention; and FIG. 6 shows an exemplary layout of memory modules of the multi-modal address book system, according to an aspect of the present invention.

DETAILED DESCRIPTION OF THE INVENTION

Figure 1:
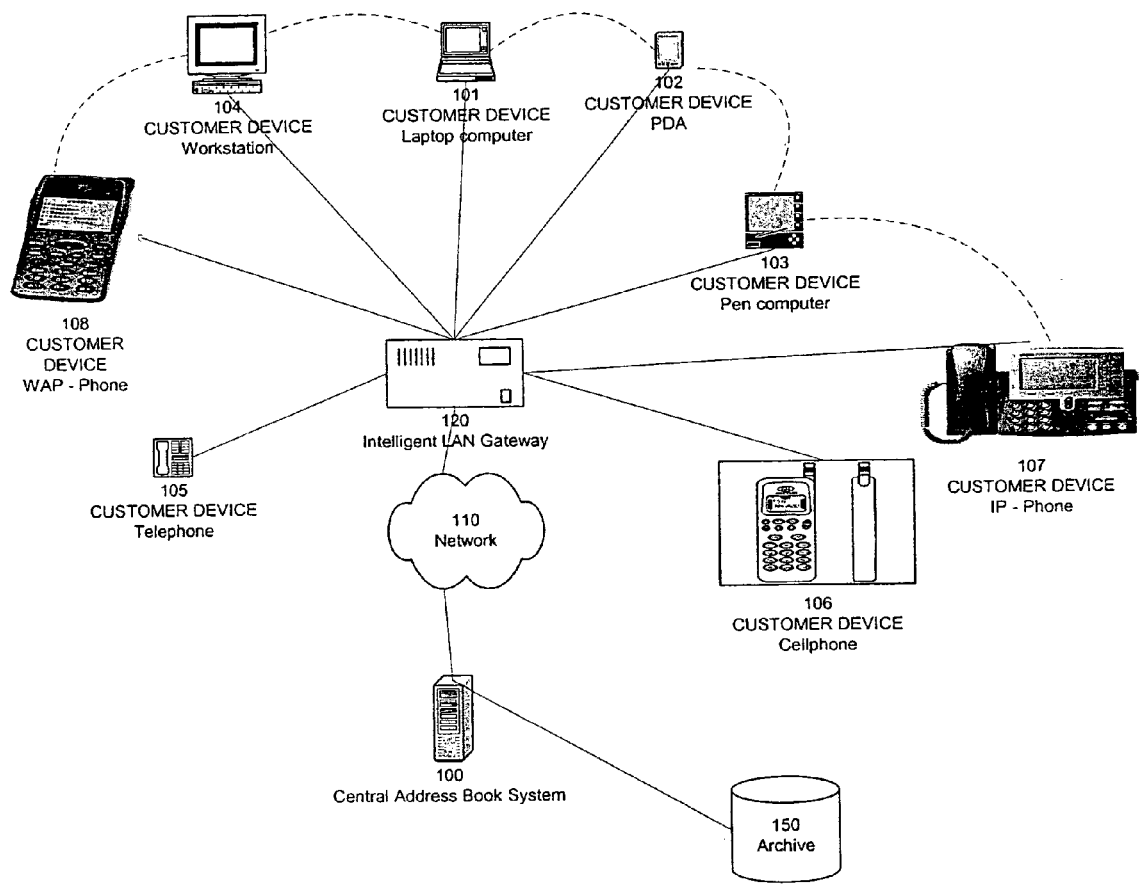
FIG. 1 shows an exemplary network architecture for the multi-modal address book system, according to an aspect of the present invention.

In view of the foregoing, the present invention, through one or more of its various aspects, embodiments and/or specific features or sub-components, is thus intended to bring out one or more of the advantages as specifically noted below.

In one aspect of the invention, a telecommunications method is provided for synchronizing multi-modal address book information for a customer associated with an account in an electronic communications environment. The multi-modal address book is associated with a customized profile of the customer and has multiple entries. Each entry of the multi-modal address book is associated with a communications partner and includes at least one address. The method includes synchronizing information of a centrally stored copy of the address book with a copy of the address book provided at a remote communications device when information of an entry is altered at either the centrally stored address book and the copy of the address book. An indicator is stored in association with an entry of the address book. The indicator indicates that an address book of a communications partner corresponding to the entry is to be automatically updated when the profile of the customer is altered. The address book of the communications partner is updated without regard to a modality used to communicate with the stored address.

In another aspect of the present invention, the stored indicator indicates that the corresponding communications partner is to be notified when the profile of the customer is altered.

In a further aspect of the present invention, the customized profile includes information of at least one communications device corresponding to the customer. In still another aspect of the present invention, the indicator indicates that a communications partner is to automatically receive updates when the information corresponding to the at least one communications device of the customer is altered.

In still another aspect of the present invention, a determination whether the customer wants to update the address book is made when a communication is received from a new communications partner. The new communications partner is associated with a unique ID and an address. A new entry is created for the new communications partner using at least one of a predefined process and a predefined template.

In another aspect of the present invention, communications are routed from a communications partner corresponding to the indicator according to an updated profile of the customer.

In yet another aspect of the present invention, communications are routed from a communications partner corresponding to the indicator according to the updated address book of the communications partner. In a further aspect of the present invention, the communications from the communications partner are routed to the updated address when the communications partner meets a criteria specified by the customer.

In another aspect of the present invention, the communications from the communications partner are routed to the updated address when the address corresponding to a communications device used by the communications partner meets a criteria specified by the customer.

In still another aspect of the present invention, the communications from the communications partner are routed to the updated address when the modality of the communications device used by the communications partner meets a criteria specified by the customer.

In a further aspect of the present invention, the communications from the communications partner are routed to the updated address when the date and time of the communications meet a criteria specified by the customer.

In another aspect of the present invention, information of multiple communications partners associated with the indicator are stored in association with the profile of the customer.

In yet another aspect of the present invention, the address book of the customer is updated when a profile corresponding to an entry of the address book of the customer is updated.

In still another aspect of the present invention, the address book of the customer is updated only when the entry of the address book corresponding to the updated profile of the communications partner is stored in association with the indicator.

In another aspect of the present invention, a computer readable medium stores a computer program that provides a multi-modal address book associated with a customized profile of a customer. The multi-modal address book has multiple entries. Each of the multiple entries is associated with a communications partner and includes at least one address. The computer readable medium includes an information synchronizing source code segment that synchronizes information of a centrally stored copy of the address book with a copy of the address book provided at a remote communications device when information of an entry is altered at either the centrally stored address book or the copy of the address book. The computer readable medium also includes an indication storing source code segment that stores an indicator in association with at least one of the entries of the address book. The indicator indicates that an address book of a communications partner corresponding to the at least one entry is to be automatically updated when the profile of the customer is altered. The address book of the communications partner is updated without regard to a modality used to communicate with the stored address.

In another aspect of the invention the computer readable medium includes an intention determining source code segment that determines whether the customer wants to update the address book when a communication is received from a new communications partner. The computer readable medium also includes an information associating source code segment that associates the new communications partner with at least a unique ID and an address. The computer readable medium additionally includes an entry creating source code segment that creates a new entry for the new communications partner using a predefined process and/or a predefined template.

In yet another aspect of the present invention, the computer readable medium includes a communications routing source code segment that routes communications from a communications partner corresponding to the indicator. The communications are routed according to the updated profile of the customer.

In still another aspect of the present invention, the computer readable medium includes a communications routing source code segment that routes communications from a communications partner corresponding to the indicator according to the updated address book of the communications partner.

In another aspect of the present invention, the communications from the communications partner are routed to an updated address when the communications partner meets a criteria specified by the customer.

In a further aspect of the present invention, the computer readable medium includes an address book updating source code segment that updates the address book of the customer when a profile corresponding to an entry of the address book of the customer is updated.

A communications system provides a centrally stored, multi-modal address book (or meta-address book) for a customer of a communications service. The address book includes contact information for communications partners of the customer. Copies of the centrally stored address book may be stored in association with remote communications devices of the customer. Information of the remote address book copies is synchronized with the centrally stored address book. The communications system also provides a profile for the customer that includes customer contact information (e.g., customer addresses, available times, incoming communications filters). A list of trusted communications partners may be stored in association with the profile. In the alternative, address book entries for trusted communications partners may be indicated in a customer's address book. When profile information is updated by the customer, the updated contact information is forwarded to trusted communications partners so that trusted communications partners are informed of current contact information for a customer.

The profile may be stored in a markup language format, e.g., XML in a relational or object database. The system may be provided over a network such as the internet (WWW), the public switched telephone network (PSTN), or an advanced intelligent network (AIN). The system includes a transcoding/transformation layer, an address book repository, a profile management/intelligent routing module and a synchronization module.

FIG. 6 shows an exemplary memory module layout for the multi-modal address book system. A central memory 600 includes the transcoding/transformation layer 601, the profile management/intelligent routing module 602, the synchronization rules module 603 and the address book repository 604. A separate mailbox/storage database 605 is also shown. Of course, the central memory 600 can be arranged with configurations of the various layers, modules and repositories that differ from the configuration shown in FIG. 6. For example, address book repository 604 may be provided as an adjunct memory or a remote memory. Additionally, the central memory 600 may include multiple media for storing the various layers, modules and repositories of the multi-modal address book system.

The address book may be transcoded/transformed at the transcoding/transformation layer 601 and provided in various formats to local servers such as a gateway server, a web server or a Microsoft (MS) exchange server. The address book may also be transcoded/transformed and provided in various formats to local devices, such as WAP or Internet enabled cell phones or personal digital assistants (PDAs).

The address book repository 604 contains address books, including information and meta-information of nodes (entries) and addresses stored in the address book. An entry corresponds to a communications partner and may include information of multiple devices or communications-related accounts for the listed communications partner. A communications partner can be a person or an organization. Entries and individual addresses of each entry may be linked to a profile of a trusted communications partner and automatically updated when the trusted communications partner updates their profile information.

The address book repository 604 may include information used by the intelligent routing module. For example, an address book entry may include information relating to routing rules for contacting a communications partner. In an embodiment, an address book entry may be flagged as corresponding to a "trusted" communications partner, i.e., a communications partner that is given special priority and privileges with respect to communications with the customer.

While an address book entry may be flagged as noted above, most routing information for a communications partner to contact the customer is stored in a profile management/intelligent routing module 602. The profile management/intelligent routing module 602 includes tools for a customer to manage and update information relating to a customer's networked devices. For example, a profile management/intelligent routing module 602 allows a customer to provide and update routing instructions for the customer's networked devices. The profile management/intelligent routing module 602 may also include information relating to the functionality of the customer's devices, such as modality/format, address, processing capability etc.

The profile management/intelligent routing module 602 uses rules determined by the customer to route incoming communications among the customer's devices. The profile is stored at the profile management/routing module and includes a hierarchy of rules for various devices and delivery methods. The profile management/intelligent routing module 602 includes device activation and device retirement data and rules for routing, forwarding, and translation. Of course, device activation and retirement activities may be performed by a service provider and affect how the profile management/intelligent routing module 602 routes communications.

A profile management module may be provided separate from an intelligent routing module. In the case that the modules are provided separately, the profile management module provides an interface to the routing module. In the case of separate modules, the profile management module may be used to update a customer's profile. Additionally, updated routing information may be stored in association with a profile and the profile may be stored at the routing module so that calls are routed according to the profile information.

As noted previously, an individual entry of an address book at the address book repository may be "flagged" to indicate that the communications partner is "trusted" by the address book customer. However, a list or file of trusted communications partners may be stored in association with the profile of a customer at the profile management/routing module. The trusted relationships may be one-way or mutual, in which case different indicators may be used to distinguish between mutual trust and one-way trust. For example, a customer may indicate that, e.g., Jack Smith, is trusted, though Jack Smith's profile or address book is not instructed to the effect that the customer is trusted. In the alternative, both Jack Smith and the customer may have indicated that the other is "trusted". If the trusted relationships are stored as a list in association with a customer's profile, then a separate list may be provided to indicate relationships of mutual trust.

The synchronization rules module 603 stores synchronization rules for updating information among components of the address book system. Synchronization rules may include rules for recognizing potential duplicates of address book entries (i.e., information that may belong in a single entry), and rules for copying updated information to each local copy of an address book. Of course, a particular update may be provided for a customer profile or an entire address book. Additionally, a particular service may be provided to multiple communications partners according to information in an address book or profile. For example, updated customer information may be automatically forwarded to multiple communications partners designated by the customer's address book or profile. The frequency and extent of updates may vary depending on the level of service purchased by the customer of a multi-modal address book service.

The synchronization rules module 603 establishes priority levels for synchronizing information among profiles, entries and addresses of a subscriber and communications partners. The synchronization rules module 603 may also contain scheduling applications for scheduling synchronization for communications and updates. The synchronization rules module 603 may also facilitate the output of entire address books when copies of address books are forwarded to local servers or individual communications devices.

The transcoding/transformation layer 601 can translate the centrally stored address book into the needed formats of the local copies of address books for downloading. The transcoding/transformation layer allows the customer to receive a message in a format different than the format in which the message was originated. However, even if a transcoding/transformation layer is not provided or used, a customer may still receive notifications of messages so that the customer is informed of the existence of messages in a different format. Additionally, transcoding/transformation can be used to format, e.g., a local copy of an address book, in accordance with the modality of a local device that uses the local copy of the address book.

As an example, transcoding can be used to translate world wide web content from one markup language to another, e.g., from HTML to WML or XML. Additionally, data transformation can be provided for configuring data from one XML format to another XML format, e.g., xCBL to cXML. Transcoding is used to ensure content is presented properly to a customer or communications partner while data transformation is used to ensure data is properly integrated in the content. Furthermore, data translation may be used for mapbased translation or configuration and grammar-based translation of one format into a completely different format, e.g., EDI to XML or SQL to EDI.

As an example, data translation may be associated with speech synthesis when an audio recording is translated into audio files and then to text. Accordingly, the transcoding/ transformation layer can be used to convert a voice message into an email format or vice versa. As a result, a communication can be routed according to a customer's profile, even though the communication needs to be translated to another format, or transcoded to another markup language, before a message can be presented to a customer.

The address book system may also include optional mailboxes and storage systems that allow a customer to store messages in a customized manner. Optional mailboxes (archives) may be provided to store information in a variety of formats such as audio files, XML messages and text email. Accordingly, a customer can retrieve messages in an appropriate language or format when the customer is not available at the time the communication is initially routed according to the customer's profile. Moreover, using the transcoding/ transformation layer 601 of the present invention with optional storage systems, message information and data may be stored or forwarded multi-modally, i.e., in a different format than the format in which a message is originally sent. Additionally, the multi-modal address book system can provide customized addressing instructions across multiple modes, so that a customer may receive communications using a convenient device.

When the address book system is used to route a communication or message, the routing is usually initiated from a local copy of a customer's address book. The functionality will be limited for conventional telephones that cannot, as a rule, store and update sophisticated data. In the case of conventional telephones, a communication request will be routed to an address book that is not located on the conventional telephone. Of course, address book functionality may be fully provided on internet protocol (IP) enabled phones, although specific functionality may vary by device. For example, a customer may write an email to "Mike Stone" routing it from the address book. The customer does not need to know that Mike's email address and routing rules for Mike's address book have changed; for example, the entry for "Mike" was automatically updated on the customer's address book.

For example, if Mike Stone is traveling and the customer is a trusted communication partner of Mike Stone, the customer's message will be automatically delivered to Mike's pager if Mike has designated his pager as a "first" device for the trusted communication partners. Another customer that is not a trusted communication partner of Mike Stone may be automatically routed to Mike's new work telephone number (voicemail) where the customer can leave a message according to routing rules set by Mike for a work-related, non-trusted communication partners group.

If an address book has been updated with information according to the profile of the communications partner, the address book system will use the updated address information to route communications from a customer to the communications partner. The actual routing is affected by either gateway servers or the central address book system components described herein. Therefore, the email will pass through the components of the address book system described herein so that the email is, e.g., routed, transcoded/transformed and stored, according to the customer's address book and/or the profile of the communications partner.

FIG. 1 shows an exemplary service architecture for providing the multi-modal address book service. The exemplary service architecture includes a central address book system 100, a network 110, an intelligent LAN gateway 120, customer devices 101, 102, 103, 104, 105, 106, 107 and 108, and an archive 150.

The central address book system 100 includes hardware components and software components. In an embodiment, the central address book system 100 includes memory, servers, processors and routers, none of which are shown in FIG. 1. Processors and routers are well known in the art; as a result a detailed description of the specific operation thereof is intentionally omitted. The server(s) may be a web server and/or an application server(s) that are provided for processing messages of a specific communications format or a specific application. Accordingly, multiple servers may be provided to ensure communications capability for multiple formats and modes of the multi-modal address book service.

Various memory apparatuses (not individually shown) may be provided, including, e.g., a database. A database of the central address book system 100 may be, for example, a relational database, an object-oriented database or an XML data/instruction database.

The memory apparatuses of the central address book system 100 may be used to store information of the transcoding/ transformation layer, the address book repository, and the software modules of the multi-modal address book system of the present invention. In an embodiment, the address book repository provides a central directory of customers, an address book for each customer and a profile for each customer. The transcoding/transformation is performed using instructions stored at the transcoding/transformation layer. Additionally, a record synchronization module is provided for scheduling system resources, including coordinating the publishing/copying of the transcoded/transformed local address book copies to local communications devices. The central address book system also includes a profile management module that stores processing instructions for obtaining input from a customer.

The embodiment of FIG. 1 shows the central address book system 100 connected to the internet 110. The internet 110 is connected to an optional intelligent local area network (LAN) gateway 120, and the optional LAN gateway 120 is connected to a variety of communications devices 101-108. In particular, in the embodiment of FIG. 1, the customer may access the internet using any of several communications devices connected to the LAN gateway 120. Conversely, using the multi-modal address book system of the present invention, the customer may update a customer profile so that only predetermined types of communications are routed to a customer's device from communications partners. Of course, the optional LAN gateway may be provided for less than all of the communications devices 101-108. In the alternative, communications devices 101-108 may be connected to additional optional LAN gateways (not shown).

The network 110 is merely representative of a communications network connected to the central address book system 100. The network 110 may be, for example, the internet, the public switched telephone network, an advanced intelligent network, or another type of communications network. Additionally, as should be clear, the central address book system 100 may be connected to multiple communications networks. Moreover, each communications network may be connected to multiple intelligent LAN gateways similar to intelligent LAN gateway 120. The address book system can also utilize inter-protocol gateways, such as a WAP gateway (not shown), to route and transcode messages.

The Intelligent LAN Gateway 120 of FIG. 1 may be used to store local copies of customer profiles and address books in order to reduce the requirements of the central address book system 100. In particular, Intelligent LAN Gateways or other intermediate devices may be used to store and process updates, messages and other information and data for the central address book system 100 and/or the customer devices 101-108. Accordingly, a copy of an updated address book may be forwarded to an intelligent LAN Gateway 120 or other local device from the central address book system 100, and then forwarded to the customer devices 101-108. Additionally, if a wireless LAN is provided, a customer device, e.g., IP-phone 107, may download a copy of an address book from another customer device, e.g., workstation 104. Connections between customer devices that may be used to download local copies of address books are indicated by the dashed lines between customer devices 101-104 and 107-108.

In the embodiment of FIG. 1, a customer communications device 105 is a telephone. The telephone may be connected to either the public switched telephone network (PSTN) if the phone is a wireline phone, or the phone may interface with a wireless network if the phone is wireless. Of course, a conventional telephone will not have the same functionality using the present invention as, for example, a personal digital assistant (PDA) 102. For example, a conventional telephone may not include a processor or a memory. Therefore, a conventional telephone may have limitations requiring additional measures in order to route communications using the address book system. Accordingly, processing and memory functions for a telephone device may be performed at a network element such as a switch, a database associated with a switch, an intelligent peripheral or a service node/intelligent peripheral, none of which are shown in FIG. 1. Additionally, a cell phone 106, Internet Protocol (IP) phone 107, WAP enabled cellular phone 108 etc., will not have the same limitations as conventional telephones, although IP or WAP phones may vary by model. In other words, an IP phone 107 and WAP phone 108 may include processing and memory functionality not possessed by conventional telephones. Of course, well known proprietary communications devices and systems such as the Blackberry™ may also be provided with processing and memory functionality.

Accordingly, a telephone may be a so-called "smart" phone, or other intelligent mobile communications device that is connected to a network using, for example, session initiation protocol (SIP). A smart communications device using session initiation protocol is disclosed at, for example, U.S. patent application Ser. No. 10/083,472 to S. Parolkar et al., filed Feb. 27, 2002, and entitled "Multi-Modal Dialing Mechanism", the disclosure of which is expressly incorporated by reference herein in its entirety.

Additionally, the processing instructions and modules of the multi-modal address book system may be stored at one storage medium or spread among many storage mediums of the central address book system 100. Storage mediums for data and processing instructions may be provided at a single location or spread among multiple locations. For example, archived messages may be stored at a single database associated with the central address book system 100, or stored among several databases associated with the central address book system 100. Information including address books and customer profiles may be stored based upon geographic information of the customer or the modality of the customer's devices. Furthermore, a customer, such as an organization, may have information for a group of individuals stored at a common location such as a memory provided at the customer's premises or associated with a local server. Additionally, messages and data may be stored at, for example, a portable computer readable medium provided with a customer's communications device or on a local memory device of a customer's personal computer. If a customer desires, messages may be downloaded to a connected local device, e.g., a laptop computer, either upon receipt and transcoding/transformation, or with a predefined frequency.

Figure 2:
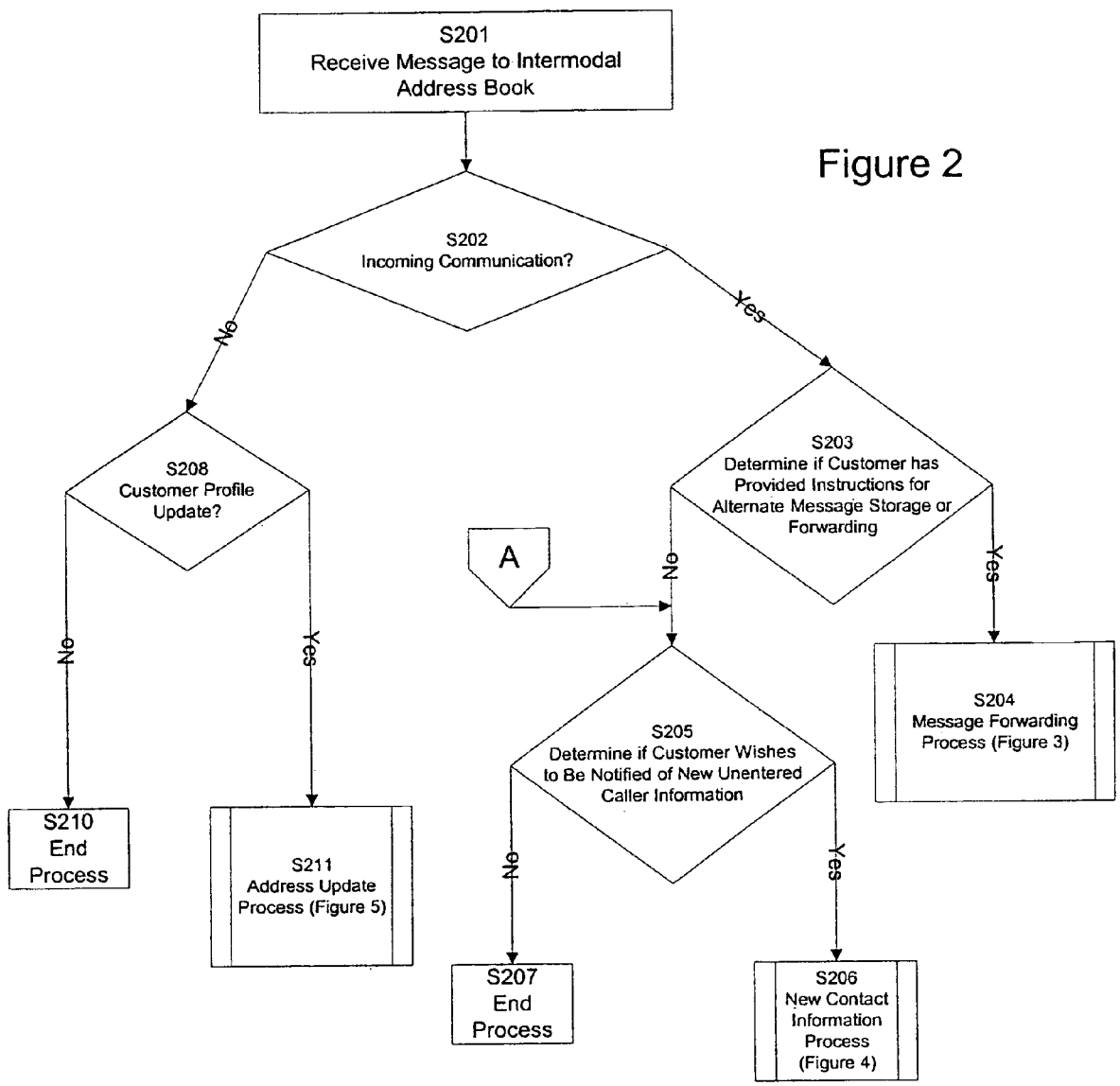
FIG. 2 is a flow chart showing an exemplary method of initiating a process of the multi-modal address book system, according to an aspect of the present invention.

FIG. 2 shows an exemplary flow chart for initiating several processes of the address book when a message to a multi-modal address book system is received. At S201, the address book system receives an initial message. Messages directed to the address book system may be routed to a customer from a communications partner. Alternatively, messages detected by the address book system may be internal, e.g., updates from a customer. At S202, the address book system determines whether the detected message relates to an incoming communication from a communications partner. A message from a communications partner will normally be addressed to a specific customer of the multi-modal address book provider, while an internal message may be addressed to, e.g., an address associated with the address book service.

Figure 3:
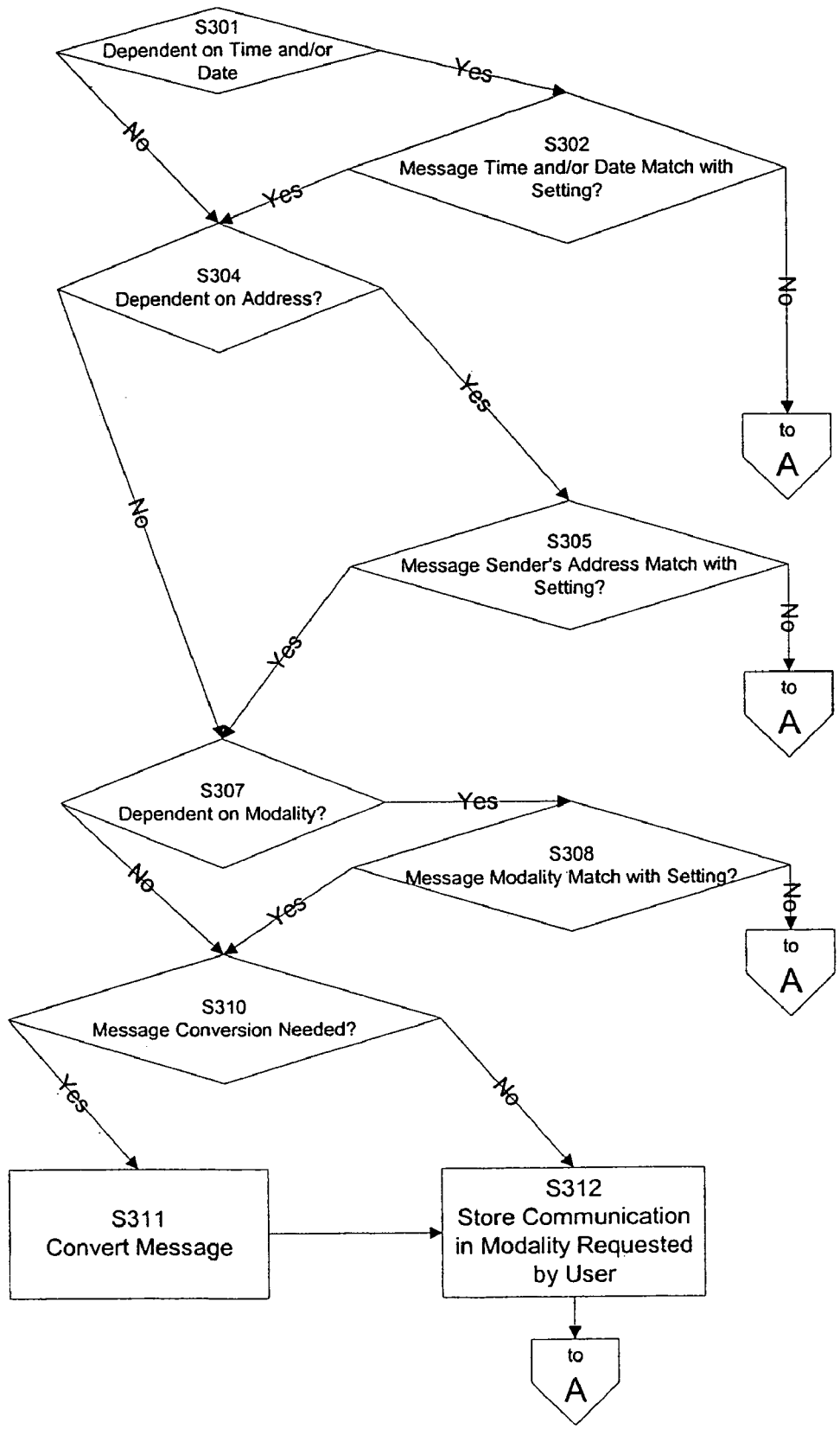
FIG. 3 is a flow chart showing an exemplary method of routing a communication using the multi-modal address book system, according to an aspect of the present invention.

When the message is notifying the system of an incoming communication from a communications partner (S202: Yes), at S203 the system determines whether the customer has provided instructions for alternate message storage or message routing. When the customer that is receiving the incoming communication has provided instructions for alternate message storage or message routing (S203: Yes), the alternate message routing process is invoked at S204 (FIG. 3).

As was described previously, a customer may update a profile to arrange for message routing. The multi-modal address book system of the present invention allows a customer to leave instructions so that selected communications from communications partners are routed to the customer. In addition, when a customer updates a customer profile, an address book of a trusted communications partner may be updated with the customer's new information. Accordingly, a message from a communications partner may be routed according to alternate instructions of the customer, if the customer has provided instructions for alternate message storage or message routing.

When the customer that is receiving the incoming communication has not provided instructions for alternate message storage or message routing (S203: No), the system determines at S205 if the customer wishes to be notified of new unentered communications partner information. When the customer wishes to be notified of new unentered communications partner information (S205: Yes), the new contact information process is invoked at S206 (FIG. 4). When the customer does not wish to be notified of new unentered communications partner information (S205: No), the process for the incoming communication ends at S207.

When the message received at S201 is determined not to relate to an incoming communication at S202 (S202: No), the system determines if the message relates to a customer profile update at S208. When the message relates to a customer profile update (S208: Yes), the address update process is invoked at S211 (FIG. 5). However, if the customer profile update is not invoked at S208 (S208: No), the process for the received message ends at S210.

Of course, the process shown in FIG. 2 could be modified to include additional processes, including a determination of whether an additional process relating to the multi-modal address book is to be carried out. For example, a message received at the multi-modal address book system could relate to the initiation of new service for a new customer, the discontinuation of service for an existing customer, or messages from alternate address book systems that interact with the multi-modal address book system of the present invention.

Additionally, a message could relate to a customer request to change service, including adding a service such as full message transcoding/transformation to an existing service agreement.

A message received at the multi-modal address book system could relate to a customer setting up trusted relationships or adding new entries or new addresses to the address book. As should be apparent, a customer can add information of a communications partner into an address book using, for example, a home computer, a PDA, a call center agent or interactive voice response functionality of the public switched telephone network (PSTN) or an advanced intelligent network (AIN). Interactive voice response functionality would normally be provided using an intelligent peripheral or a service node/intelligent peripheral. An example of voice response functionality using intelligent peripherals and service node/intelligent peripherals is provided in U.S. patent application Ser. No. 10/200,977 to BOOK et al., entitled "Unrecognized Number Identifier", the disclosure of which is expressly incorporated by reference herein in its entirety.

An additional process for updating a customer's address book when a communications partner updates a profile may be provided. In such a process, an update to a profile of a communications partner will result in a process within the address book system whereby the customer's address book is updated. A customer may receive updates in response to a trigger as a special arrangement of an address book service. Of course, an address book may also receive scheduled periodic updates, in addition to or in lieu of real-time updates. Updates to a profile of a communications partner may be handled differently than a message to the intermodal address book of S201. However, a process of updating communications partners may be performed recursively or hierarchically so that each of a group of communications partners are notified of updates to a customer's profile. Of course, if the update to a profile results in a message to an address book of a communications partner, a process may be performed in place of S210. For example, a "Communication Partner Profile Update" determination may be made in place of S210, in which case a process will occur to update the communication partner's address book entry for the customer. Additional modifications to the process of FIG. 2 are within the scope of the present invention.

FIG. 3 shows an exemplary call flow for message routing using the address book system and method of the present invention. As should be apparent, message routing can be used to route messages to a communications device of a customer, as well as to a storage device of the system for later retrieval by the customer. For example, a message may be routed to an email server or a voicemail platform of the PSTN or an AIN, as well as to an answering machine of the subscriber. Of course, depending on the customer's instructions, the system may first attempt to route a communication such as an instant message or a phone call directly to a device of the customer before storing a message.

The message routing process begins when a message is received or communication is initiated at S201 (see FIG. 2). At S203, a determination is made whether the customer has provided instructions for alternate message routing. When the customer has not provided instructions for alternate message routing (S203: No), a determination is made whether the customer wants to be notified of new unentered communications partner information at S205. When the customer has provided instructions for alternate message routing (S203: Yes), a determination is made at S301 whether the alternate message routing is dependent on the date and time of the incoming message. When the alternate message routing is dependent on the date and time of the incoming message (S301: Yes), a determination is made at S302 whether the date and time of the incoming message are within the parameters set by the customer. When the date and time of the incoming message are not within the parameters set by the customer (S302: No), at S303 the alternate message routing process is ended and a determination is made whether the customer wants to be notified of new unentered communications partner information at S205.

As should be apparent, when the incoming message does not meet the parameters set by the customer for alternate message routing, the communication will be routed by default to the address selected by the communications partner. As a result, when a message is to be left for the subscriber and the incoming communication is in a synchronous communications mode such as a phone call, the incoming communication may still be forwarded and stored at, for example, a voicemail platform or an answering machine when the customer is not available to answer the call. Additionally, when the incoming communication is in an asynchronous communications mode, such as an e-mail, the incoming communication may be stored at, for example, a memory apparatus associated with an application or email server. Thus, even when alternate message routing is not set by the customer, a message may still be left for the customer when the subscriber is not available at the address selected by the communications partner. In this case, archiving may either be determined by default settings (e.g., default=leave message) or by the nature of the communication (e.g., email message=store message). Additional functionality related to archiving, e.g., an amount of time to store non-retrieved, archived communications, may be defined according to a communication service provider.

When the alternate message routing is not dependent on date and time (S301: No), or if the message date and time are within the parameters set by the customer (S302: Yes), a determination is made at S304 whether the alternate message routing is dependent on the address of the communications partner sending the incoming message. When the alternate message routing is dependent on the communications partner's address (S304: Yes), a determination is made at S305 whether the address of the communications partner is within the parameters set by the customer. When the address of the communications partner is not within the parameters set by the customer (S305: No), the message routing ends and the process moves to S205 of FIG. 2.

When the alternate message routing is not dependent on the communications partner's address (S304: No), or if the address of the communications partner is within the parameters set by the customer (S305: Yes), a determination is made at S307 whether the alternate message routing is dependent on modality of the incoming communication. When the alternate message routing is dependent on the modality of the incoming message (S307: Yes), a determination is made at S308 whether the modality of the incoming message is within parameters set by the customer. When the modality of the incoming message is not within the parameters set by the customer (S308: No), the message routing ends and the process moves to S205 of FIG. 2.

When the alternate message routing is not dependent on the modality of the incoming message (S307: No), or if the message modality is within the parameters set by the customer (S308: Yes), a determination is made at S310 if message conversion is needed. When message conversion is needed (S310: Yes), the message is converted at S311. The message conversion may be performed at, for example, the transcoding/transformation layer of the central address book system 100 described with respect to FIG. 1.

After the message is converted at S311, or if message conversion is not needed (S310: No), the message is forwarded to a device of the customer or stored in accordance with the modality requested by the customer at S312. After S312, the message routing ends and the process moves to S205 of FIG. 2.

Accordingly, in FIG. 3, the multi-modal address book of the present invention determines when an incoming communication matches the criteria set by a customer for a message routing and storage service. As a result, by customizing a profile, a customer can leave specific instructions regarding which communications will be forwarded to the customer and which communications will be stored in an accessible memory format for the customer.

Figure 4A:
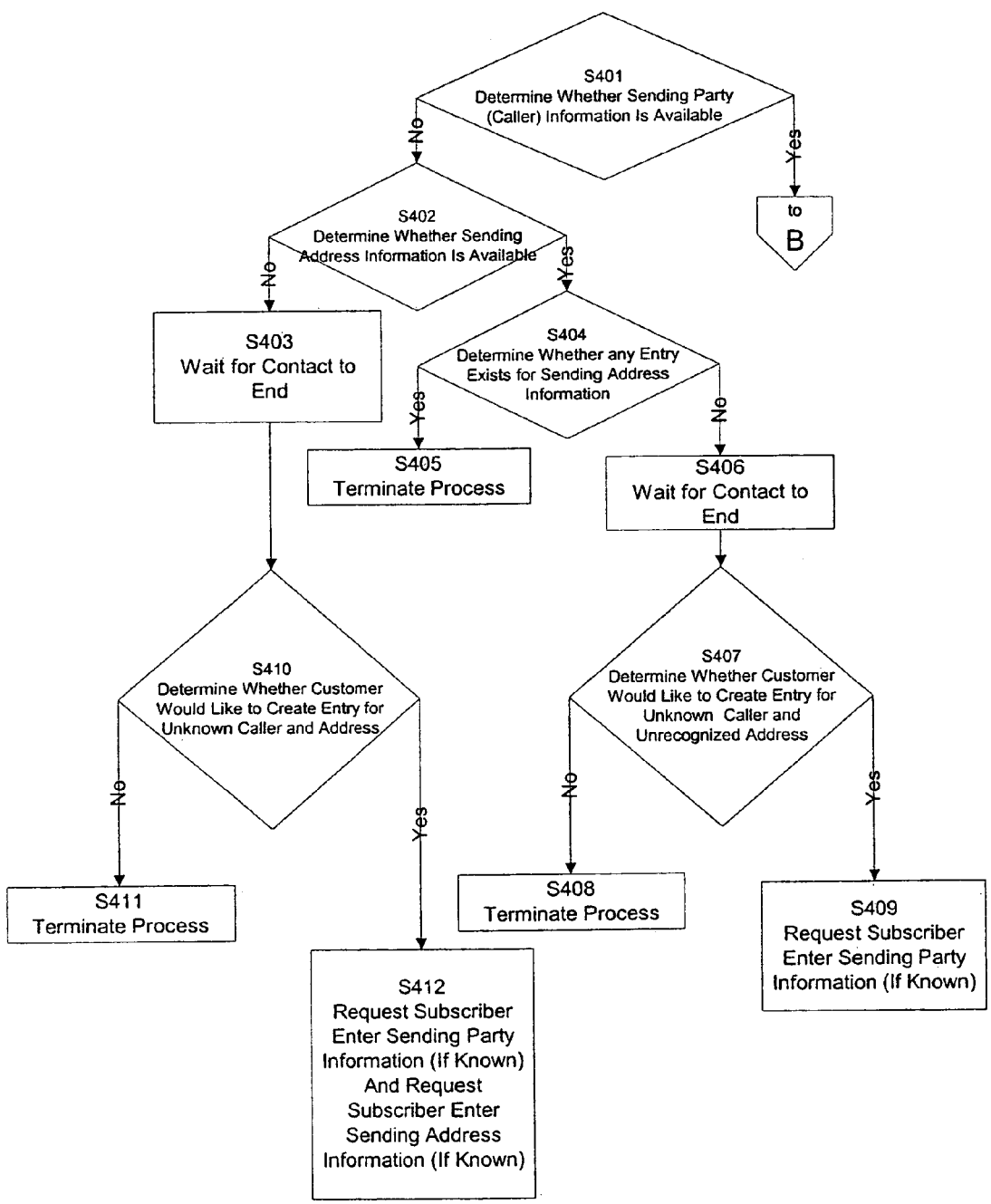
FIGS. 4a-4c are flow charts showing an exemplary method of adding a new entry or address using the multi-modal address book system, according to an aspect of the present invention.
Figure 4B:
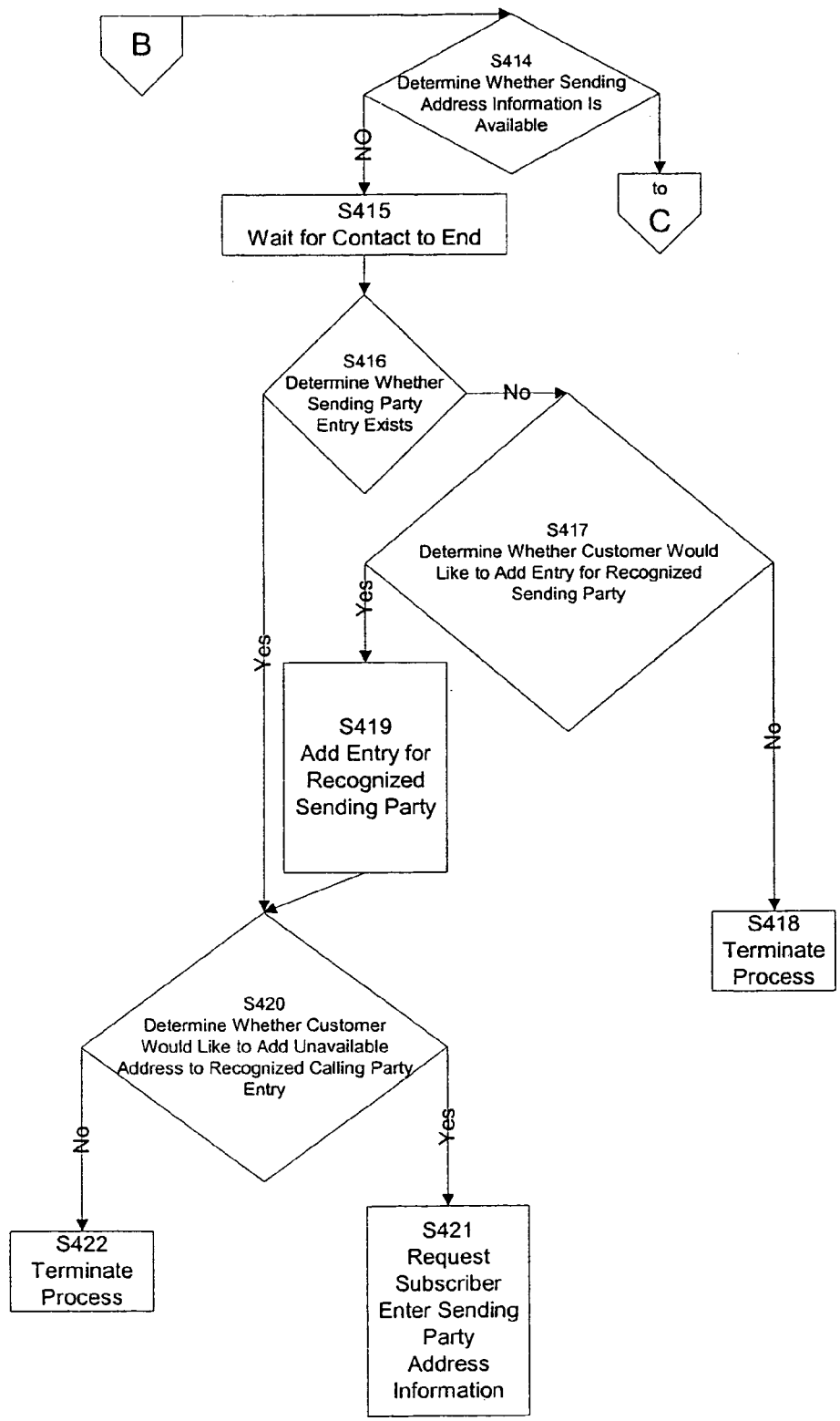
Figure 4C:
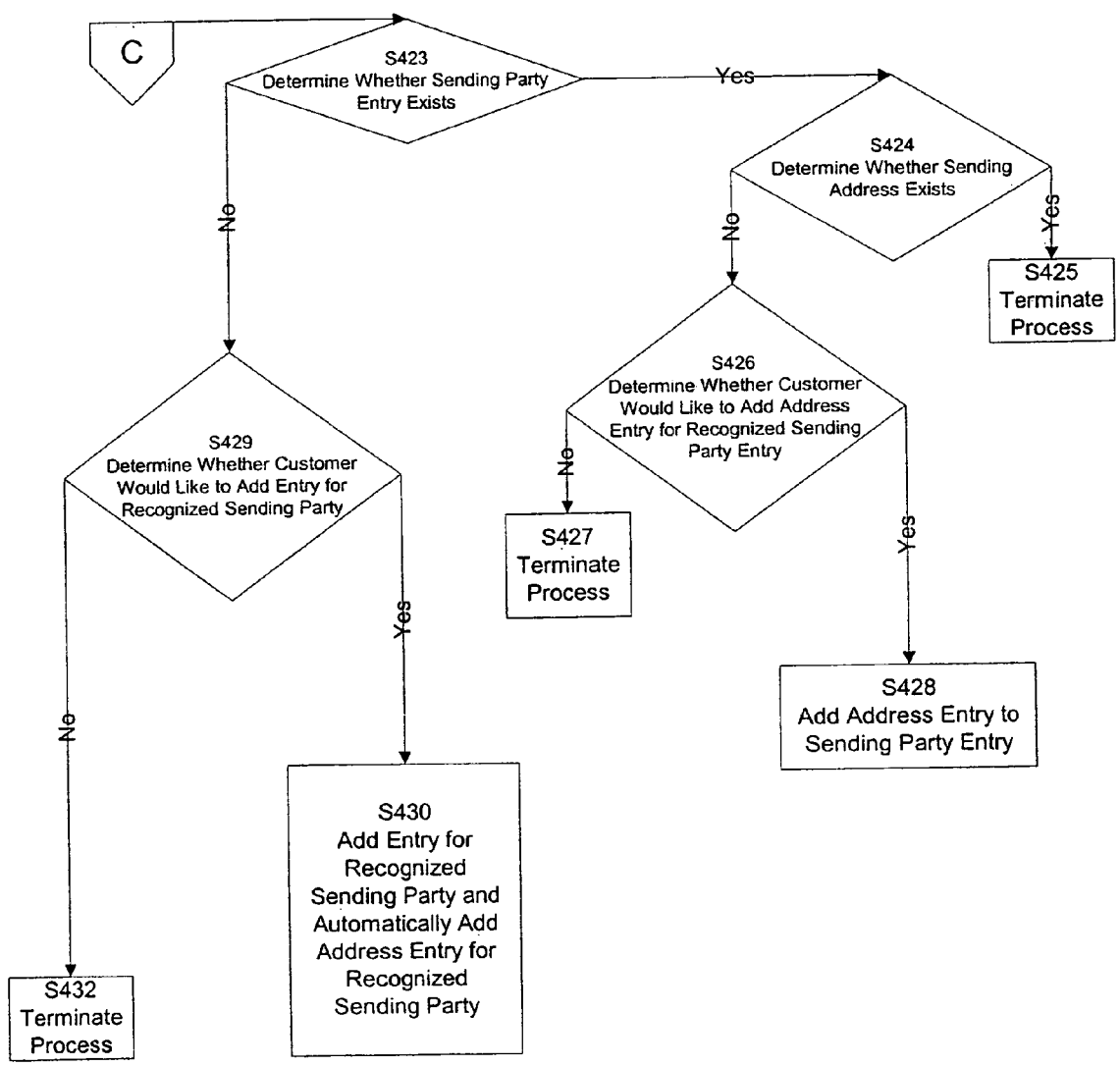

FIGS. 4a-4c show an exemplary flow chart for adding a new entry or address when a communication is received at a customer's communications device from an unrecognized address. At S401 a determination is made whether the information of the communications partner is available.

When sending party information is not available (S401: No), a determination is made at S402 whether address information of the communications partner is available. When sending address information is not available (S402: No), the process waits at S403 for the contact to end between the communications partner and the customer. When the contact ends, at S410 a determination is made whether the customer would like to create an entry for the unknown communications partner and address. For example, at S410, in a synchronous communications session such as a phone call, the customer may be presented with an audio message asking if the customer would like to create an entry and/or address for the last communications partner. Of course, the multi-modal address book service may use additional settings to filter out unsolicited callers. For instance, a step prior to S410 may include determining whether a phone call lasted more than 90 seconds. Alternatively, when a customer selects an email for review, a "pop-up" screen may appear asking if the customer would like to create an entry and/or address for the communications partner that sent the last e-mail. In other words, the multi-modal address book service may restrict interaction with the subscriber to those communications that are most likely to correspond to a communications partner for whom the subscriber wishes to maintain an updated address book entry (e.g., a lengthy phone call).

When the customer does not wish to create a new entry or address (S410: No), the process is terminated at S411. When the customer wants to create a new entry or address (S410: Yes), the customer is requested at S412 to enter the information of the communications partner. The customer may be asked to enter the information of the communications partner by, for example, typing the information into a keyboard or keypad, or speaking the information into a mouthpiece of a handset or headset. Also at S412, after the customer is asked to enter the communications partner's information, the customer is requested to enter the sending address information. The creation of a new address book entry may be initiated on any device, e.g., a cell phone, but the entry may be adjusted later, for example to add information to default settings. A customer may adjust default settings of an entry using, e.g., a Web application. Moreover, a number of features may be predefined for each new entry so that manual intervention is limited.

If a communication request is routed using the address book system and a customer's entry is present in an address book of the communications partner, the customer is matched with the respective entry and the customer is recognized. Of course, a request from a customer may not be recognized when the customer originates a communication from, e.g., a public computer. When the communication is routed from an address of an entry known to the communication partner's address book, the address book can be updated in real time, or a record may be triggered to schedule a next update.

In an interactive update mode, a customer may be allowed to make choices as in the example process described above. Of course, if a communication is routed using the address book system, but from an address not known to the communication partner's address book, the entry may be added automatically as described for a known, but unrecognized, sending address.

When the sending address information is available at S402 (S402: Yes), a determination is made at S404 whether an entry already exists for the sending address information. When the sending address information exists for an entry (S404: Yes), the process is ended at S405. However, if sending address information does not exist (S404: No), the process waits for the contact to end at S406. When the contact ends, a determination is made at S407 whether the customer wants to create an entry for the unknown communications partner and unrecognized address. Similar to the restrictions that may be set before S410, a pre-determination may be made that the customer is likely to want to create an address book entry for a communications partner before the customer is queried at S407. When the customer does not wish to create an entry (S407: No), the process ends at S408. However, if the customer wants to create an entry (S407: Yes), the customer is requested to enter communications partner information to create the entry at S409. Of course, there is no need to enter sending address information at S409 because the address information is already available for automatic entry, as indicated in the determination at S402. Additionally, the multi-modal address book service may use additional settings to filter out unsolicited callers or so-called "spam" email. For instance, a step prior to S409 may include determining whether the customer actually reviewed an e-mail rather than selecting the e-mail for deletion without selecting the e-mail for review.

At S401, if a determination is made that the communications partner information is available (S401: Yes), a determination is made at S414 whether sending address information is available. When sending address information is not available (S414: No), the process waits for the contact to end at S415. When the contact ends, a determination is made whether a communications partner's entry exists at S416. When an entry does not exist corresponding to the communications partner (S416: No), a determination is made at S417 whether the customer wants to add an entry for the recognized communications partner. When the customer does not wish to add a new entry (S417: No), the process is terminated at S418. When the customer wants to add a new entry (S417: Yes), the process adds a new entry for the recognized communications partner at S419.

When the process adds an entry for the recognized communications partner at S419, or when the process determines that the communications partner's entry exists (S416: Yes), a determination is made at S420 whether a customer wants to add unavailable address information to the recognized calling party entry. When the customer does not wish to add an address to the entry (S420: No), the process is terminated at S422. However, if the customer wants to add an address to the recognized calling party entry (S420: Yes), the customer is requested to enter the communications partner information at S421.

When the sending address is determined to be available at S414 (S414: Yes), a determination is made at S423 whether an entry exists for the communications partner. When an entry does not exist for the communications partner (S423: No), a determination is made at S429 whether the customer wants to add an entry for the recognized communications partner information. When the customer does not wish to add an entry for the recognized communications partner information (S429: No), the process is terminated at S432. However, if the customer wants to add an entry for the recognized communications partner information (S429: Yes), an entry is added for the recognized communications partner at S430. Also at S430, an address is automatically added for the newly added communications partner.

When the communications partner information is determined to exist at S423 (S423: Yes), a determination is made at S424 whether the communications partner's address exists. When the communications partner's address exists, the process is terminated at S425 because the communications partner information has been previously entered into the address book. However, if the sending address information is determined not to exist at S424 (S424: No), a determination is made at S426 whether the customer would like to add an address entry for the recognized communications partner's entry. When the customer does not wish to add an address to the recognized communications partner's entry (S426: No), the process is terminated at S427. However, if the customer wants to add an address entry for the recognized communications partner's entry (S426: Yes), address information is added to the communications partner's entry at S428.

As should be clear from the description of the embodiment shown in FIGS. 4a-4c, additional processes may be added to refine the multi-modal address book service. For instance, a customer may wish to minimize interruptions or the time spent reviewing information for unrecognized communications partners and unrecognized addresses. Accordingly, the address book service may attempt to minimize the amount of times a customer is requested to make a determination by, for example, automatically blocking some communications or by ignoring, for example, synchronous communications sessions (e.g., phone calls or instant messaging sessions) that last only a very short period.

FIG. 5 shows an exemplary flow chart for automatically updating address book information for a trusted communications partner that occurs, for example, when the customer updates information of the customer's profile. The first entry in the customer's address book is retrieved at S 501. A determination is made at S 502 whether the entry corresponds to a trusted communications partner. When the entry corresponds to a trusted communications partner (S502: Yes), the first address for the entry is retrieved at S503. At S504, the modality for the communications device corresponding to the retrieved address is determined. The profile update is transcoded into a compatible format for the communications device of the trusted communications partner at S505. At S506, the profile update is forwarded to the communications device.

A determination is made at S507 whether another address exists for the entry. When another address exists for the entry (S507: Yes), the next address is retrieved at S508 and the process returns to S504. When another address does not exist for the entry (S507: No), a determination is made at S509 whether the entry is the last address in the address book. When no entries remain to be processed in the address book (S509: No), the process is ended at S511. However, if another entry exists in the address book (S509: Yes), the next entry is retrieved at S510 and the process returns to S502 so that a determination can be made if the next entry corresponds to a trusted communications partner.

As described above, hierarchical rules may be provided to ensure, for example, that multiple entries associated with a group of communication partners, are updated when profile information of the customer is updated. Accordingly, communication partners may be categorized into groups of, e.g., classes, organizational departments, or committees.

When a retrieved entry does not correspond to a trusted communications partner (S502: No), a determination is made at S512 whether the entry is the last entry in the address book. When the entry is the last entry in the address book (S512: Yes), the process is ended at S513. However, if another entry remains in the address book (S512: No), the next entry in the address book is retrieved and the process returns to S502. Accordingly, the process shown in FIG. 5 will result in notifying trusted communications partners when a customer updates profile information. Of course, a similar process can be used when a separate list of trusted communications partners is maintained in association with the customer's profile.

Examples of XML-based address book profile information appear below. The various segments show exemplary XML-based information for defining access protocols for a customer to access and update the profile, restrictions for a message routing service, settings for trusted communications partners, and specific routing instructions.

In the first instruction set below, the first line defines the XML version and encoding method used for the profile. The second line defines the name of the XML segment (AddressBookProfile). Profile information, including a unique ID corresponding to the customer associated with the profile, is specified in lines three and four. Additional lines may be used to define vocabulary, XML name-space links (i.e. xmlns), cross-links (i.e. xlink), and a version number for the address book profile.

| | |
|---|---|
| (1) | <xml version="1.0 encoding=UTF-8"> |
| (2) | <abp:AddressBookProfile> |
| (3) |    <abp:ProfileInfo> |
| (4) |       <abp:ProfileID 123456789> |
| (5) |       </abp:ProfileID> |

An exemplary process for synchronizing updated profile information with trusted communications partners is specified at lines six through eighteen. Line six specifies the name and version number for the process (i.e., "ProcessSpecification" and "1.0"). Lines seven and eight specify a cross link and cross link type for the trusted synchronization process. Lines nine through twelve specify the access level of the customer and include a link to an administrative consumer page that specifies information for trusted communications partners. An access level specified by "Role" may be provided, for example, when a communications device is used by more than one person, such as a household phoneline or email account. Accordingly, a parent may ensure that a child does not edit the communications profile.

| | |
|---|---|
| (6) |    <abp:ProcessSpecification abp:version="1.0" |
| (7) | abp:name="TrustSynchronize" xlink:type="simple" |
| (8) | xlink:href="http://www.address-book.com/processes/TrustSynchronize.xml"/> |
| (9) |       <abp:Role abp:name="adminConsumer" xlink:type="simple" |
| (10) | xlink:href="http://www.address-book.com/processes/TrustSynchronize.xml#admin |
| (11) | Consumer"/> |
| (12) |       </abp:Role> |

Lines thirteen through eighteen specify an authorization/authentication code that is sought from the customer in order to access the profile.

| (13) | <abp:CertificateRef abp:certId="N03"/> |
|---|---|
| (14) | <abp:Certificate abp:certId="N03"> |
| (15) | <ds:KeyInfo> |
| (16) | <ds:KeyName>CustomerA_AppCert_Key</ds:KeyName> |
| (17) | </ds:KeyInfo> |
| (18) | </abp:Certificate> |

Of course, an authorization/authentication function associated with communications between trusted communication partners or with updating a profile could be supported by multiple authentication forms. For example, an authorization/authentication function could be supported by biometric, ID/password, certificate-based and origination-based protocols.

In an embodiment, authentication may be provided for a customer of an address book service when initiating a communication to another customer of an address book service. For example, an authentication code or certificate may be automatically associated with a communication initiated by a customer.

Additionally, a customer of an address book service may be provided with services and benefits not available to other users of a communications system. For example, shortened and updated addressing may be provided to a customer utilizing an updated address book. Accordingly, a customer using an address book may communicate more conveniently with a partner than would a customer without an address book.

In a second exemplary XML segment that appears below, information associated with a specific communications line or type of communications line is used by a profile or address book to route calls. Line one specifies the communications line (channelID) that is referenced to an individual customer, such as a telephone number or internet protocol (IP) address. Lines two and three specify characteristics for synchronous communications. For example, if synchronous access were to be denied to telephones, asynchronous access may be provided to allow the contacting party to leave a message. Lines four and five specify characteristics for asynchronous communications. In the example provided below, line four indicates an instruction utilized when a mailbox is created to support asynchronous communication. For example, line four may be used to specify that incoming communications are archived using, for example, a voicemail system. As was previously noted, a communications mode may be asynchronous by nature, such as email.

The confidentiality characteristic specified at line five may be used to indicate that only selected communications partners are allowed to view, retrieve or route communications according to a customer's updated profile. For example, the confidentiality characteristic may ensure that only authorized users are allowed to view particular information in an address book. Additionally, the authentication characteristic may be used to ensure that an authentication process occurs before a customer is allowed to review the information (authenticated). For example, authentication may include an analysis of the origination of a device used to review the information. Line six specifies the end of the delivery channel module.

| (1) | <abp:DeliveryChannel abp:channelID="364859"> |
|---|---|
| (2) | <abp:Characteristics abp:syncReplyMode="Yes" |
| (3) | abp:confidentiality="true" abp:authenticated="true"/> |
| (4) | <abp:Characteristics abp:asyncReplyMode="Yes" |
| (5) | abp:confidentiality="true" abp:authenticated="true""/> |
| (6) | </abp:DeliveryChannel> |

Lines seven through nine below specify the update mode for updating trusted partners corresponding to two specified ID numbers. Line seven specifies a first trusted communications partner (ProfileID) and lines eight and nine specify a second trusted communications partner. Furthermore, line nine specifies that the trust level is not "two-way" (i.e., not mutual). Additionally, the UpdatePriority may be used to ensure that a customer receives profile updates from a communications partner quickly without waiting for a scheduled periodic update. An update to the customer's profile will be used to update address books of trusted communications partners. Trusted communications partners listed in the customer's address book (or in a trusted partners list associated with the profile) will have the customer's information in their own address books automatically updated. In other words, when the customer updates his profile, the corresponding address book of each trusted communications partner is updated automatically.

| (7) | <abp:TrustedProfile abp:ProfileID="3334478" abp:synchUpdateMode="No"/> |
|---|---|
| (8) | <abp:TrustedProfile abp:ProfileID="3334567" abp:synchUpdateMode="Yes" |
| (9) | abp:UpdatePriority="High" TwoWay="No"/> |

Line one of a third exemplary XML script that follows corresponds to a group of phone addresses specified for the customer's profile. Lines two and three specify a device by type and phone number. Line three also specifies that the listed telephone is active. Lines four and five specify that the phone has been designated to receive both synchronous and asynchronous communications. Line four specifies that there will be one attempt; if it fails, the user will have a choice to switch to asynchronous mode such as voicemail, be routed to a SecondInGroup address or be routed to a different group. Line five specifies that the device is capable of receiving asynchronous updates. For example, an internet enabled "smart phone" may be capable of receiving both synchronous communications and asynchronous updates. Line six specifies protocols for updating the devices (i.e., PhoneProtocol). Line seven specifies that the device (DeviceAddress) will be contacted first in the telephone group by people who connect using address books to contact the customer corresponding to the DeviceAddress.

| (1) | <abp:DeviceGroup abp:DeviceGroupID="657483" DeviceGroupName="Phones"> |
|---|---|
| (2) | <abp:Device abp:DeviceID="657499d-65" abp:DeviceType="LandlinePhone" |
| (3) | abp:DeviceAddress="512-471-5467" abp:DeviceStatus="Active" |
| (4) | abp:synchUpdateMode="Yes" abp:Attempts="1" abp:Choice="yes" |
| (5) | abp:asynchUpdateMode="Yes" abp:DeviceName="Primary Work Phone Line" |
| (6) | abp:SendingProtocol="PhoneProtocol" abp:ReceivingProtocol="PhoneProtocol" |
| (7) | abp:DevicePriority="FirstInGroup"> |

```
(8)        </abp:Device>
(9)    </abp:DeviceGroup>
```

In another exemplary XML segment that appears below, an instruction is provided to indicate when a person is working from home. When a customer is working from home, a temporary phone definition may be provided for the customer's profile so that communications are temporarily routed to an alternate address. An example of a SecondInGroup for temporary phone definitions appears below.

In general, a person who connects using the address book will select the addressee's name and will be connected to the primary device in the same device group; or primary device for the originator defined in the rules; or the primary device for the whole profile if the addressee has limited availability. Thus, in order to contact customer Marie when she is working from home, the address book owner only needs to select her name in, e.g., the cell-phone-adapted address book, and he/she will be directed to the FirstInGroup device in the phone group, her primary home line. When Marie can only use a pager, the notification will be automatically delivered to her pager after Marie's name is selected using the cell phone. The communications partner does not need to try several numbers/modes of access, or manually review Marie's various addresses. Although Marie's information in the customer's address book will be dynamically updated if there is a trusted relationship between Marie and the customer, the update need not be in real time to facilitate correct routing. For example, the routing rules for a particular customer may reside on the central system in addition to the address books of communication partners. Therefore, a customer's communication to Marie may be routed to the central address book system and routed according to Marie's updated routing rules.

In an embodiment, Marie's routing rules may be present on Marie's communications devices rather than on the devices of each communication partner. A customer may wish to store routing rules on their own devices because devices of communications partners may not be provided with adequate memory and processing power. Of course, as communications devices are improved in the future, the need to store routing rules at a destination device may disappear.

The XML segments of lines one to thirteen in a fourth exemplary XML segment below specify a temporary arrangement. The first device is given the priority "FirstInGroup". However, the device status is changed to "Off". The second device is given an "Active" status until a particular date, e.g., Nov. 4, 2002 with an Active priority of FirstInGroup. In other words, the second device is designated as the temporary primary routing destination for the customer though the device status is normally set as SecondInGroup. The exemplary XML segment that appears below is similar to the third exemplary XML segment provided above. The module at lines one through seven indicates that the designated device is off at line two. Additionally, the module specifies that the designated device will not receive synchronous communications at line three. Additionally, line six specifies that communications are to be routed to DeviceID 657499d-66. Information and instructions for DeviceID 657499d-66 are provided at lines eight through fifteen. Lines nine and ten stand in contrast to lines two and three, in that the second device is indicated as active and will accept synchronous communications. Additionally, the fourth exemplary XML segment shows that a default priority (DevicePriority) may be suspended while a temporary priority (ActivePriority) is valid. The second device's active priority (ActivePriority) is indicated as FirstInGroup until Nov. 4, 2002 at line thirteen, though the second device's DevicePriority is otherwise indicated as SecondInGroup at line fourteen.

```
(1)    <abp:Device DeviceID="657499d-65" abp:DeviceType="LandlinePhone"
(2)    abp:DeviceAddress="512-471-5467" DeviceStatus="Off"
(3)    abp:synchUpdateMode="No" abp:Attempts"1" abp:Choice="yes"
(4)    abp:asynchUpdateMode="Yes" abp:DeviceName="Primary Work Phone Line"
(5)    abp:SendingProtocol="PhoneProtocol" abp:ReceivingProtocol="PhoneProtocol"
(6)    abp:ForwardTo="657499d-66" abp:DevicePriority="FirstInGroup">
(7)    </abp:Device>
(8)    <abp:Device DeviceID="657499d-66" abp:DeviceType="LandlinePhone"
(9)    abp:DeviceAddress="512-455-5289" abp:DeviceStatus="Active"
(10)   abp:synchUpdateMode="Yes" abp:Attempts="1" Choice="yes"
(11)   abp:asynchUpdateMode="Yes" abp:DeviceName="Primary Home Phone Line"
(12)   abp:SendingProtocol="PhoneProtocol" abp:ReceivingProtocol="PhoneProtocol"
(13)   abp:ActivePriority="FirstInGroup" abp:DateEnds="11/04/2002"
(14)   abp:DevicePriority="SecondInGroup">
(15)   </abp:Device>
```

A fifth exemplary XML instruction set is also provided below. In the exemplary XML instruction set below, a device is first described at lines one to nine, and then described differently at lines ten through nineteen to highlight the flexibility of a profile according to the present invention. Accordingly, line one is identical to line ten, and line two is identical to line eleven. However, in the first instruction set, the DeviceStatus in Active, as shown at line three. In contrast, the DeviceStatus is Off in the second instruction set. As a result, the first device is in a synchronous mode, as indicated at line four, while the second device is not in the synchronous mode, as indicated at line thirteen. As a result, while the first instruction set specifies that three attempts will be made to reach the specified device (see line four), the second instruction set specifies that zero attempts will be made to reach the specified device (see line thirteen). Furthermore, at line sixteen, the second instruction set specifies that communications are to be forwarded and archived.

```
(1)     <abp:DeviceGroup DeviceGroupID="657474" abp:DeviceGroupName="Email">
(2)         <abp:Device DeviceID="657499d-75" abp:DeviceType="PC/Email"
(3)     abp:DeviceAddress="marie@company.com" abp:DeviceStatus="Active"
(4)     abp:synchUpdateMode="Yes" abp:Attempts="3" abp:Choice="yes"
(5)     abp:asynchUpdateMode="Yes" abp:DeviceName="Primary Work Email"
(6)     abp:SendingProtocol="SMTP" abp:ReceivingProtocol="Pop3"
(7)     abp:DevicePriority="FirstInGroup">
(8)         </abp:Device>
(9)     </abp:DeviceGroup>
(10)    <abp:DeviceGroup DeviceGroupID="657474" abp:DeviceGroupName="Email">
(11)        <abp:Device DeviceID="657499d-75" abp:DeviceType="PC/Email"
(12)    abp:DeviceAddress="marie@company.com" abp:DeviceStatus="Off"
(13)    abp:synchUpdateMode="No" abp:Attempts="0" abp:Choice="no"
(14)    abp:asynchUpdateMode="Yes" abp:DeviceName="Primary Work Email"
(15)    abp:SendingProtocol="SMTP" abp:ReceivingProtocol="Pop3"
(16)    abp:ForwardTo="465749056" abp:Archive="Yes"
(17)    abp:DevicePriority="FirstInGroup">
(18)        </abp:Device>
(19)    </abp:DeviceGroup>
```

As shown in the fifth instruction set, a customer can set up a filter so that specified communications, e.g., non-work, are sent to her SecondInGroup email (not-shown) or other email addresses. If the customer is traveling where there is no internet connection, but access exists by satellite phone, the email will be forwarded to the mailbox at the satellite phone and read (speech-synthesized from the transcoding/transformation layer). If the mailbox does not have text-to-speech capability, the email routing feature may be enabled for only address books of a few trusted communications partners. If a mailbox is not enabled to transcode/transform a message from a communications partner, Marie will only receive a notification (e.g., email from John Brown, on Nov. 5th, 2002, 14:55 GMT, subject "Deal Signed.").

The instruction at line sixteen indicates that a communications partner that uses an address book to connect to Marie (e.g., a trusted user), will have their email routed to a voicemail box at DeviceID 465749056 and archived. A communications partner that emails Marie directly will need to wait until she returns for a reply.

As can be seen from the exemplary XML instructions provided above, routing rules can be provided by a customer so that communications from trusted contacts are routed to a particular device during a specified time frame. The routing rules may parse communications from particular addresses or using particular communications modes and formats. As should be clear, XML instructions, as well as instruction sets for other markup languages, may be used to carry out any of the processes and services described herein.

Communications partners with address books may have calls routed according to the routing rules. Communications may be routed automatically by GroupOrder within one group, e.g., telephones, so that communications are routed to one address of the customer at one time and to another address at another time. A communications partner corresponding to a trusted profile and an address book may have calls to a landline routed to a cell phone. The customer may also specify that if synchronous communications attempts are not answered within a specified number of attempts (rings), a call notification is routed to a pager group.

The customer may specify that communications from communications partners corresponding to specified profileIDs will be broadcasted to every device in the customer's profile following GroupOrder and DeviceOrder within each group until there is an answer. The rules may specify that messages from some addresses or communications partners are "urgent", so that only the "urgent" messages are routed to a particular address. The customer may instruct that non-urgent messages be stored at the addresses to which they are initially directed. Furthermore, the customer may specify a set of routing rules and then specify that the rules are to be overridden for particular communications partners or particular addresses.

The customer may also instruct that messages from a specified group of communications partners are not to be transcoded. For example, if a customer will only be available by email, the customer may instruct the system to only route email notifications of messages from a voice system, rather than have the voice messages transcoded and routed using the email.

The customer may specify that no messages are to be routed to an address during a specified time period. Alternatively, the customer may specify that all devices be set to "Off" for a specified time period so that no communications are accepted. Additionally, the customer may specify that messages be archived when first delivered, or the customer may specify that all messages and notifications from particular addresses be routed to a particular device.

Additionally, the routing rules for "trusted" communications partners may be set apart separately from the rules for other communications partners. Accordingly, a message from an address that is flagged as belonging to a trusted partner may be immediately directed to the routing rules for trusted communications partners. In other words, as is described above, using the multi-modal address book of the present invention, any number of different options may be provided to a customer to arrange for routing communications to the customer, updating communications partners when the customer's contact information changes, and storing a single address book for many different devices and accounts.

As should be understood, a customer's routing rules may be provided separate from the customer's profile and address book. A customer's routing rules may be stored, e.g., at a central address book system, local copies of the address books of communication partners, or at a LAN server connected to a communications device of the customer. Of course, routing rules may be provided in a variety of formats and modes, depending on the mode of communications used by the customer or a communication partner.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for internet and other packet switched network transmissions (e.g., XML, HTML) represent examples of the state of the art. Such standards are periodically superseded by faster or more efficient equivalents having essentially the same functions. Accordingly, replacement standards and protocols having the same functions are considered equivalents.

What is claimed is:

1. A method comprising:
   using a processing device to mark an entry of a communications partner in at least one of a plurality of customized address books of customers with an indicator that is being set for the entry;
   monitoring any changes in profile information of each customer;
   in response to a change in the profile information of a customer, determining a format of the profile information;
   if the format is not compatible with a respective communications device of the communications partner having the marked entry, change the format of the profile information into a compatible format for the respective communications device; and
   transmitting the changed profile information to the communications device.

2. The method of claim 1, further comprising:
   determining which customized address book is a customized address book the customer is authorized to update; and
   associating the indicator with the determined customized address book that is authorized to include the changed profile information.

3. The method of claim 1, transmitting occurring if a criteria specified by the communications partners having the marked entries is met.

4. The method of claim 3, using a date and time as the criteria.

5. The method of claim 3, using a modality of the communications device as the criteria.

6. The method of claim 1, further comprising:
   associating the profile information with a unique ID and an address.

7. A tangible computer readable storage medium having stored thereon computer executable instructions, execution of which by a computing device to perform operations comprising:
   marking an entry of a communications partner in at least one of the plurality of customized address books of customers with an indicator that is being set for the entry;
   monitoring any changes in profile information of each customer;
   in response to a change in the profile information of a customer, determining a format of the profile information;
   if the format is not compatible with a respective communications device of the communications partner having the marked entry, changing the format of the profile information into a compatible format for the respective communications device; and
   transmitting the changed profile information to the communications device.

8. The tangible computer readable storage medium of claim 7, said operations further comprising:
   determining which customized address book is a customized address book the customer is authorized to update; and
   associating the indicator with the determined customized address book that is authorized to include the changed profile information.

9. The tangible computer readable storage medium of claim 7, said operations further comprising:
   associating the profile information in with a unique ID and an address.

10. The tangible computer readable storage medium of claim 7, the transmitting occurring if a criteria specified by the communications partners having the marked entries is met.

11. An electronic address book, comprising:
    a processor; and
    a memory configured to store instructions that cause the processor to:
       store a modifiable user profile associated with a user of the electronic address book, wherein the modifiable user profile includes user contact information including an email address;
       store a communications partner profile, wherein a communications partner profile includes contact information associated with a communications partner and a marked entry comprising an indicator if the communications partner is to be automatically updated when changes to the modifiable user profile occur;
       communicate changes to the modifiable user profile to a central profile repository; and receive changes to the communications partner profile from the central profile repository based on the changes to the modifiable user profile if the indicator is set by:
  determining a format of the changed modifiable user profile;
  if the format is not compatible with a respective communications device of the communications partner, changing the format of the modifiable user profile into a compatible format for the communications device; and
  transmitting the changed modifiable user profile to the communications device.

12. A system, comprising:
means for storing a modifiable user profile associated with a user of the system, wherein the modifiable user profile includes user information including an email address;
means for storing a communications partner profile, wherein a communications partner profile includes information associated with a communications partner and a marked entry comprising an indicator if the communications partner is to be automatically updated when changes to the modifiable user profile occur;
means for communicating changes to the modifiable user profile to a central profile repository; and
means for receiving changes to the communications partner profile from the central profile repository based on the changes to the user profile if the indicator is set by:
  determining a format of the changed modifiable user profile;
  if the format is not compatible with a respective communications device of the communications partner, changing the format of the modifiable user profile into a compatible format for the communications device; and
  transmitting the changed modifiable user profile to the communications device.

13. A method, comprising:
using a processing device to mark an entry of a communications partner in at least one of a plurality of customized address books of customers with an indicator that is being set for the entry, each customized address book being stored on a respective communication device of a communications partner;
monitoring any changes in information of each customer;
in response to a change in the information of a customer, determining a format of the changed information;
if the format is not compatible with the communications device of the communications partner having the marked entry, changing the format of the information into a compatible format for the respective communications device; and
transmitting the information to the communications device.

14. The method of claim 13, wherein the marking of entries is accomplished using XML code.

15. The method of claim 13, wherein the communication devices are wireless.

* * * * *